N. SANDERS.
POWER LIFT FOR PLOWS.
APPLICATION FILED APR. 5, 1921.
1,386,955.
Patented Aug. 9, 1921.
2 SHEETS—SHEET 1.
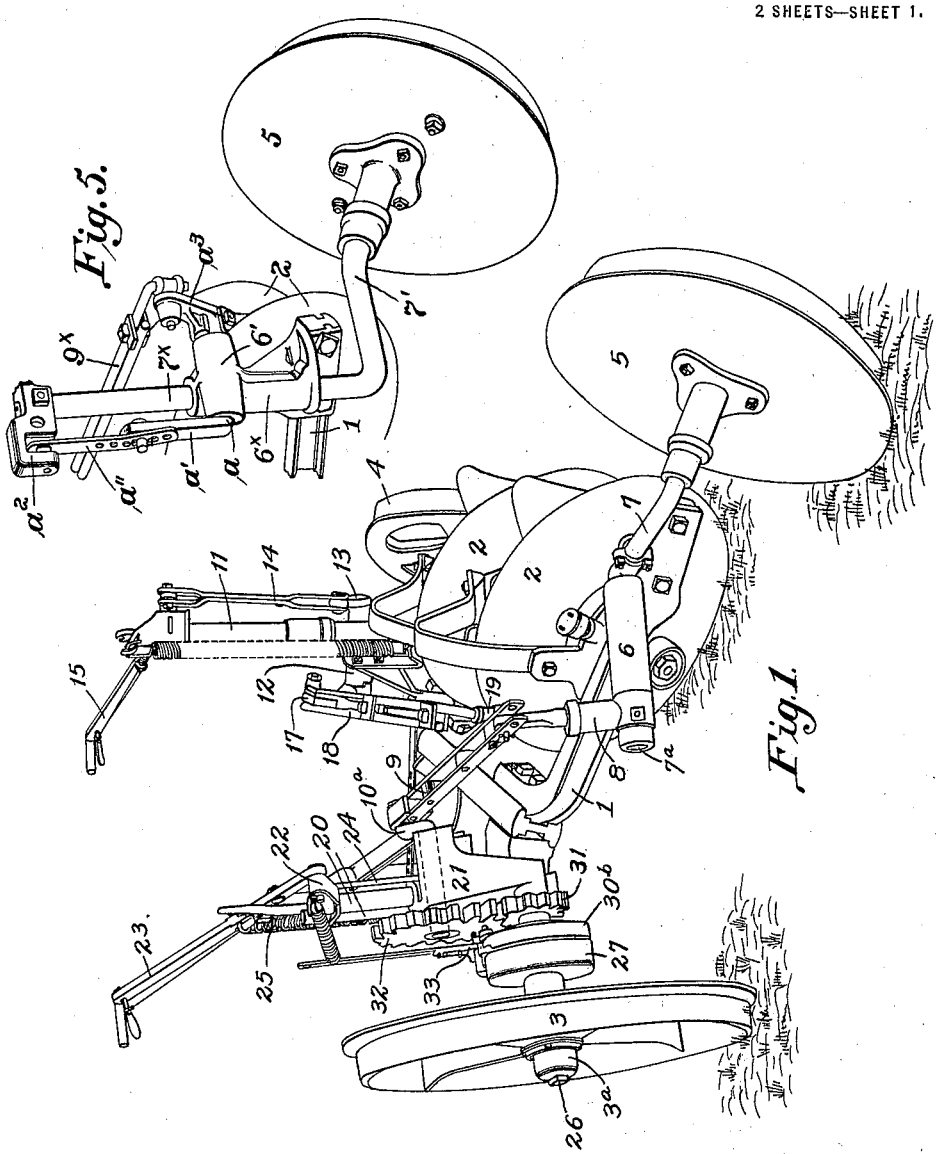
INVENTOR.
Newell Sanders
BY
Spurr Middleton Donaldson & Hall
ATTORNEY.

N. SANDERS.
POWER LIFT FOR PLOWS.
APPLICATION FILED APR. 5, 1921.
1,386,955.
Patented Aug. 9, 1921.
2 SHEETS—SHEET 2.
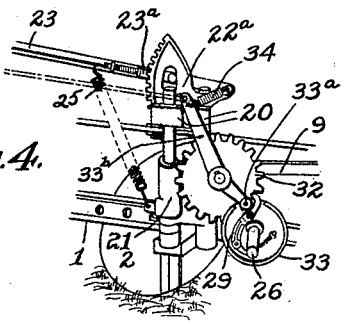
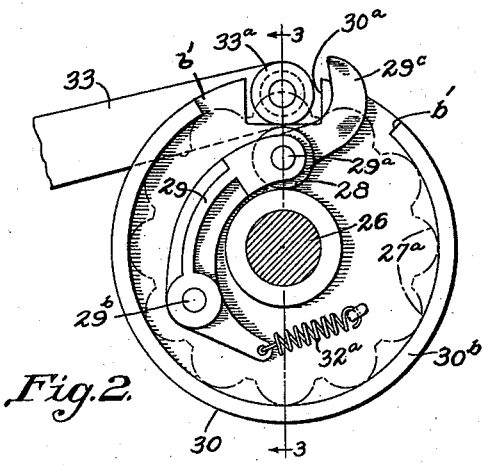
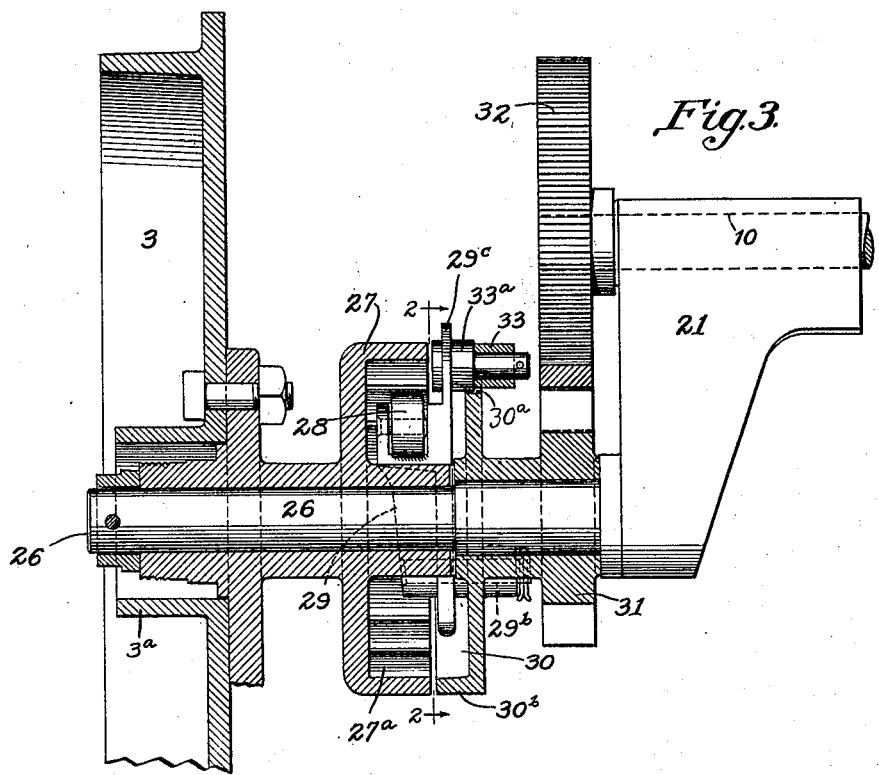
INVENTOR.
Newell Sanders
BY
Spear Middleton Donaldson & Hall
ATTORNEY.

UNITED STATES PATENT OFFICE.

NEWELL SANDERS, OF CHATTANOOGA, TENNESSEE.

POWER-LIFT FOR PLOWS.

1,386,955.  Specification of Letters Patent.  Patented Aug. 9, 1921.

Application filed April 5, 1921. Serial No. 458,800.

*To all whom it may concern:*

Be it known that I, NEWELL SANDERS, a citizen of the United States, and a resident of Chattanooga, county of Hamilton, and State of Tennessee, have invented certain new and useful Improvements in Power-Lifts for Plows, of which the following is a specification.

My present invention relates to improvements in power lifts for wheel plows and aims to provide an extremely simple, economical, durable and efficient construction, and the invention includes the novel features of construction and arrangement and combination of parts hereinafter described and particularly defined by the appended claims.

An embodiment of my invention is illustrated in the accompanying drawings in which—

Figure 1 is a perspective view showing a plow having my improved power lift incorporated therein.

Fig. 2 is a detail sectional view of the clutch on line 2—2 of Fig. 3.

Fig. 3 is a sectional view taken on line 3—3 of Fig. 2 and

Fig. 4 is a perspective detail.

Fig. 5 is a detail showing a means for vertical adjustment of the rear furrow wheel.

Referring by reference characters to these drawings, the numeral 1 designates the plow beam to which the furrow openers 2, herein shown as two disks, are connected in the usual or any desired manner. This frame is supported and carried upon three wheels—a land wheel 3, a front furrow wheel 4, and a rear furrow wheel 5.

It will be observed that as the disks are very nearly in line with or closely adjacent to the furrow wheels, while the land wheel is considerably off set therefrom, vertical movements imparted to the side of the frame to which the furrow wheels are connected will effect the lifting and lowering of the furrow openers, substantially bodily, or without an appreciable tilting. I therefore provide the furrow wheels with frame connections designed to be operated to effect the raising and lowering of the frame and utilize the land wheel as the source of power for operating such connections.

These lifting connections for the furrow wheels may be substantially those shown in the patent of M. Lundin, No. 1,362,710, dated December 21st, 1920, and detailed illustration thereof is deemed unnecessary.

They are, however, briefly described as follows:—

The lifting connection of the rear furrow wheel 5 comprises a bearing bracket 6 secured in a suitable manner to the rear end of the plow frame and having a transversely disposed bearing socket in which is journaled a transverse shaft portion $7^a$ of the crank arm 7, upon the outer end of which arm the furrow wheel 5 is journaled in the usual or any desired manner.

The end of the shaft portion $7^a$ carries fast thereon a crank arm 8, the upper end of which is connected by a link or pitman 9 with the power transmitting crank $10^a$ which is operated by the land wheel through the mechanism hereinafter described.

The front furrow wheel is journaled on a stub axle carried at the lower end of a vertical post 11 which is mounted to have perpendicular sliding movement in a socket member carried by the front end of the frame.

A rock shaft journaled in a horizontal bearing in member 12 has a crank arm 13 which is connected by link 14 with the end of a lever 15 fulcrumed on the top of the post 11 and having its free end extended to form a handle. Said lever is provided with a hand operated dog coacting with a stationary notched quadrant (not shown) on the upper end of post 11. Shaft 13 also carries a crank arm 17 which is connected by a rod or link 18 so as to operate in unison with link 9 and crank arm 8, preferably by having its rear end provided with an angularly turned end engaging a socket member 19 carried at the side of link 9.

The connection at the front end of link 18 may be made in a similar manner. The connection of link 9 with crank arm 8 is also preferably an adjustable one which may be conveniently effected by a pin and multiple hole connection as shown.

On the land side portion of the frame are mounted two parallel vertical posts 20 which guide a vertically slidable frame member 21, to which the land side wheel is connected in the manner hereinafter described. These two posts carry at their upper ends a cross head 22 to an extension of which is pivotally connected or fulcrumed a hand lever 23 which is connected by a link 24 with the slidable frame member 21 so that pivotal movement of the hand lever will effect relative vertical adjustment of the slidable frame member 21 and posts 20. A weight compensating spring 25 is interposed between the frame member 21 and the hand lever 23, this spring being conveniently in the shape of a coil tension spring as shown. The cross head 22 carries a notched quadrant $22^a$ which is designed to be engaged by a hand operated dog $23^a$ by which the hand lever may be locked in any desired position.

Frame member 21 carries an axle 26 upon which is rotatably mounted the hub $3^a$ of the landslide wheel 3. This hub has fast thereon or integrally connected thereto a clutch member including an annular clutch flange 27 which has formed in its inner periphery a series of annularly disposed recesses $27^a$ which are designed to be engaged by a dog or member 28, preferably in the form of a roller, journaled on a pin $29^a$ carried by the lock lever 29. This lock lever is pivotally connected at $29^b$ to a clutch disk or member 30 which has its hub rotatably mounted on a preferably slightly enlarged portion of the axle 26 which hub has fast thereon or formed integral therewith a gear 31. Gear 31 meshes with the gear 32 fast on a shaft 10 journaled in the frame member 21 and which carries the crank $10^a$ which is connected with the link 9 as hereinbefore described. When the clutch members 27 and 30 are disconnected, the land wheel will rotate freely, but when the clutch is operated to connect parts 27 and 30, small gear 31 will be caused to drive gear 32 and thus rotate the crank $10^a$ and through the links 9 and 18 swing the rear wheel supporting crank 7 and the front wheel operating crank 17 to effect the raising and lowering of the frame and furrow openers according to the position of parts and the direction of movement.

The engagement is effected by the roller 28 entering one of the recesses $27^a$, thus locking the parts together, the lever 29 being normally acted upon by a tension spring $32^a$ which tends to throw the roller carrying end outward. The lock lever 29 is normally held in an inoperative position by the contact portion $33^a$ of a trip lever 33, this contact portion being preferably in the form of a roller designed to enter a cutaway portion $30^a$ in the member 30. Member 30 is provided with an annular flange $30^b$ which is cutaway or interrupted at the portion indicated at $b'$. When trip lever 33 is in the position shown in Fig. 2, it holds the lock lever pressed inward toward the axle with its roller out of locking engagement with the locking recesses and the land wheel is free to rotate without affecting the raising and lowering devices. Trip lever 33 is preferably in the shape of one arm and a bell crank lever fulcrumed on the crank shaft 10 and having its other arm $33^b$ extended upwardly and placed under tension of spring 34, and also provided with means for attachment to the pull rope or other suitable operating devices not shown, such means of attachment being conveniently in the form of an eye or opening in the upper end of the lever. Thus normally under the action of spring 34 the trip lever will be held in position to retain the lock lever unclutched or inoperative, allowing free rotation of the land wheel as above stated. A pull upon the trip lever, however, will swing the roller out of notch or recess $30^a$ allowing lock lever to positively connect parts 27 and 30 in the manner heretofore described, whereupon member 30 and gear 31 will be rotated to effect the raising or lowering of the furrow openers.

As soon as this movement starts the rotation of the disk member 30 will remove the recess $30^a$ from alinement with the roller and carry the peripheral interrupted flange $30^b$ of the disk under the roller which will thereafter be held in its outward position and out of operative relation to the lock lever during one complete revolution of the parts. The ratio of the gear teeth is such that one complete revolution of the land wheel and connecting parts will effect the complete elevation of the plows or furrow openers while another complete rotation will effect the lowering thereof. As the disk member 30 rotates, the hooked end $29^c$ of the lock lever will, at the end of a complete rotation, come in contact with the roller $33^a$ which will force the lock lever into disengaging or unlocking position and the roller $33^a$ will drop into the recess $30^a$. This will simultaneously unclutch the land wheel from the driving gear 31 and also lock the gear 31 in position to positively hold the furrow opening devices in their raised or lowered positions.

It will be understood that the frame may be adjusted vertically by hand by the hand lever 15 without affecting the operation of the power raising and lowering mechanism and similarly the frame may be adjusted relative to the land wheel by the hand lever 23 without affecting the power operating connections.

It will be seen from the above that the clutch is of the one revolution character, and when it throws itself out it leaves the crank $10^a$ substantially on the dead center in relation to the connections operated thereby.

It will be observed that the gear 32 is substantially twice the diameter of the gear 31. This decreases the motion transmitted by these gears and increases the lifting power, and further causes the crank shaft $10^a$ to be left on the dead center in both directions.

In Fig. 5 I show another way of mounting the rear furrow wheel so as to be adjusted up and down from the crank $10^a$.

In this form a bearing bracket $6^x$ is used instead of the bracket 6 first described. In this bracket is slidably mounted an axle post $7^x$ to move vertically. The lower end of this post is bent at 7' to receive and properly position the rear furrow wheel. The bracket $6^x$ has a bearing 6' for a rock shaft $a$ which at one end has an arm $a'$ connected by a link $a''$ with a head piece $a^2$ bolted onto the upper end of the post $7^x$. The other end of the rock shaft has an arm $a^3$ from which a link or rod $9^x$ extends to connect with the crank $10^a$, so that when the crank turns from one position to the other, the shaft $a$ will be turned to cause its arm $a'$ through the link $a''$ to raise or lower the post, as the case may be. This construction will provide a locking effect with the parts in the position shown with the arm $a'$ and link $a''$ in their straight extended relation, with the plow in action.

Having thus described my invention, what I claim is:

1. A power lift for a wheel plow, comprising in combination a land wheel, a fixed axle therefor, a clutch, one member of which is connected with the land wheel, and the other member of which is connected with a gear wheel turnable loose on the axle, a second gear meshing with the first gear, and attached to a crank shaft, and connections from the crank shaft to the raising and lowering means of the two furrow wheels.

2. A power lift for a wheel plow, comprising in combination a land wheel, a fixed axle therefor, a clutch, one member of which is connected with the land wheel, and the other member of which is connected with a gear wheel turnable loose on the axle, a second gear meshing with the first gear, and attached to a crank shaft, and connections from the crank shaft to the raising and lowering means of the two furrow wheels, and a trip lever for controlling the clutch.

3. A power lift for a wheel plow, comprising in combination a land wheel, a fixed axle therefor, a clutch, one member of which is connected with the land wheel, and the other member of which is connected with a gear wheel turnable loose on the axle, a second gear meshing with the first gear, and attached to a crank shaft, and connections from the crank shaft to the raising and lowering means of the two furrow wheels, and a trip lever journaled on the end of the crank shaft alongside the second gear for controlling the clutch.

4. A power lift for a wheel plow, comprising in combination a land wheel, a fixed axle therefor, a clutch, one member of which is connected with the land wheel, and the other member of which is connected with a gear wheel turnable loose on the axle, a second gear meshing with the first gear, and attached to a crank shaft, and connections from the crank shaft to the raising and lowering means of the two furrow wheels, said clutch being of one revolution character, and leaving the crank substantially on the dead center in respect to the connections operated thereby.

5. A power lift for a wheel plow, comprising in combination a land wheel, a fixed axle therefor, a clutch, one member of which is connected with the land wheel, and the other member of which is connected with a gear wheel turnable loose on the axle, a second gear meshing with the first gear, and attached to a crank shaft, and connections from the crank shaft to the raising and lowering means of the two furrow wheels, said clutch being of one revolution character, said second gear being substantially of twice the diameter of the first gear, to decrease the motion and increase the power and to leave the crank shaft on the dead center in both directions.

6. A power lift for a wheel plow, comprising in combination a land wheel, a fixed axle therefor, a clutch, one member of which is connected with the land wheel, and the other member of which is connected with a gear wheel turnable loose on the axle, a second gear meshing with the first gear, and attached to a crank shaft, and connections from the crank shaft to the raising and lowering means of the two furrow wheels, said clutch being of one revolution character, said second gear being substantially of twice the diameter of the first gear, to decrease the motion and increase the power and to leave the crank shaft on the dead center in both directions, a rear furrow wheel, a vertically slidable post carrying said furrow wheel, a bracket for guiding the post, a rock shaft journaled in the bracket, an arm on the rock shaft extending upwardly therefrom, a link connected to and extending upwardly therefrom to the post, an arm on the rock shaft by which it is operated, from the crank of the power lift, said arm and link and crank shaft serving to lock the post against vertical movement while the plow is in action.

In testimony whereof I affix my signature.

NEWELL SANDERS.